(12) United States Patent
Lawman et al.

(10) Patent No.: US 7,441,118 B2
(45) Date of Patent: Oct. 21, 2008

(54) NETWORK APPLIANCE HAVING TRUSTED DEVICE FOR PROVIDING VERIFIABLE IDENTITY AND/OR INTEGRITY INFORMATION

(75) Inventors: Matthew John Lawman, Bath (GB); Siani Lynne Pearson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1187 days.

(21) Appl. No.: 10/180,964

(22) Filed: Jun. 27, 2002

(65) Prior Publication Data

US 2003/0028807 A1 Feb. 6, 2003

(30) Foreign Application Priority Data

Jun. 27, 2001 (GB) ................... 0115636.3

(51) Int. Cl.
*H04L 9/00* (2006.01)
*G06F 12/14* (2006.01)
*G08B 29/00* (2006.01)

(52) U.S. Cl. ............ 713/164; 713/165; 713/166; 713/167; 726/17; 726/21; 726/30; 726/2; 726/3; 726/4

(58) Field of Classification Search .......... 726/28, 726/29
See application file for complete search history.

(56) References Cited

U.S. PATENT DOCUMENTS 5,379,344 A 1/1995 Larsson et al.
5,931,947 A 8/1999 Burns et al.
6,336,175 B1 1/2002 Shaath et al.
6,336,187 B1 1/2002 Kern et al.
6,393,420 B1 5/2002 Peters
6,862,583 B1 * 3/2005 Mazzagatte et al. ........... 705/64
6,930,788 B1 * 8/2005 Iwamoto et al. ............ 358/1.15
6,931,503 B1 8/2005 Robb et al.
6,938,154 B1 * 8/2005 Berson et al. ................ 713/156
6,948,065 B2 9/2005 Grawrock
7,062,651 B1 * 6/2006 Lapstun et al. .............. 713/168
2002/0080974 A1 * 6/2002 Grawrock .................... 380/282
2002/0103904 A1 8/2002 Hay
2006/0005253 A1 * 1/2006 Goldshlag et al. ............. 726/26

FOREIGN PATENT DOCUMENTS

EP 0768606 A2 4/1997
GB 2 340 630 A 2/2000
WO WO 87/02154 A1 4/1987
WO WO 99/31842 A1 6/1999
WO WO 00/48063 A1 8/2000

* cited by examiner

*Primary Examiner*—Ayaz Sheikh
*Assistant Examiner*—Saoussen Besrour

(57) ABSTRACT

A trusted device, physically associated with a network appliance that does not include a CPU, communicates with at least one component of the appliance and is accessible via a network connection to the device for providing a signal indicative of a condition of the appliance. The appliance can be a storage box having bulk non-volatile memory storage locations. The component is an ASIC of a controller of the appliance. The trusted device acquires a true value of an integrity metric of the appliance which is reported by the trusted device to a challenger. The component then provides the root of trust for measurement. The trusted device provides the root of trust for reporting. In a RAID controller assembly, each RAID controller has its own trusted device.

28 Claims, 3 Drawing Sheets publicised
to authorised
users

A typical hardware Trusted Platform Module

NETWORK APPLIANCE HAVING TRUSTED DEVICE FOR PROVIDING VERIFIABLE IDENTITY AND/OR INTEGRITY INFORMATION

TECHNICAL FIELD

This invention relates to network appliances, by which we mean a device addressable through a network. Examples of network appliances are printers and fax machines. The network appliance may be a household appliance provided with a network connection. The invention relates particularly, but not exclusively, to network storage devices which may take the form of tape drives, disk drives, or magnetic box storage devices for example. The network may comprise wired and/or wireless communication links.

BACKGROUND OF THE INVENTION

The provision and maintenance of reliable bulk non-volatile storage devices is increasingly likely to be made the responsibility of an organization which charges other people or organizations for the shared use of the storage devices. The computing platforms of those other organizations are linked to the storage devices by way of some network. One reason for such a commercial arrangement is that such bulk memory devices need to be very reliably operated and maintained, and the sharing of the facility by different organizations has advantages. For example, the physical security of the storage devices can be more easily afforded when the cost is shared by many users. Another reason is that storage needs cannot always be accurately predicted.

The invention is applicable to network storage devices in various environments such as NAS (network attached storage) and SAN (storage area network) environments.

The term 'storage box" is used herein to denote any bulk non-volatile memory storage device that is capable of being used as a network storage device. The invention is concerned with providing storage security features for such a storage box.

The wide availablility of a network appliance to different users gives rise to a need for security features. Most storage security features have in the past been provided in a LAN by application software at a server or personal computer (PC) level but such solutions are not feasible in an NAS environment for example, since the software may be open to attack through the network connected to the server. For example, it is envisaged that tape drive software might be modified in an unauthorized manner so that it 'bounces' received sensitive material to other parts of the network for fraudulent putposes.

Typically the data stored in the storage box relate to financial transactions and bank account numbers, and it is desirable that such data should only be readable by the person or organization that has provided the data to the storage box, or with their permission.

SUMMARY OF THE INVENTION

We have appreciated that it would be advantageous to incorporate a trusted component into a network appliance that does not include a CPU (central processing unit), such as a microprocessor.

According to a first aspect of the invention, a network appliance that does not include a CPU comprises a trusted device physically associated with the network appliance. The trusted device is connected for communication with at least one component of the appliance and is accessible by way of a network connection to the device for providing a signal to verifiably identify the network appliance to other network nodes so as to provide evidence that at least one capability of the appliance can be trusted.

The term trusted means a device that can be 'trusted' to always behave in the expected manner for the intended purpose.

Such a network appliance is conveniently termed a 'trusted appliance.'

According to a second aspect of the invention, a network appliance that does not include a CPU comprises a trusted device means which is physically associated with the network appliance. The trusted device means is connected for communication with at least one component of the appliance and is accessible by way of network connection means to the trusted device means for providing a signal to verifiably identify the network appliance to other network nodes so as to provide evidence that at least one capability of the appliance can be trusted.

In a preferred embodiment of the invention a trusted storage box comprises a bulk non-volatile memory storage location, an input/output unit for connection to a network, a controller for controlling reading and writing of data from and to the storage location, and a trusted device physically associated with the storage box.

According to a third aspect of the invention, a trusted storage box comprises a bulk non-volatile memory storage location, an input/output unit for connection to a network, a controller for controlling reading and writing of data from and to the storage location. A trusted device physically associated with the storage box is connected for communication with at least one component of the storage box and is accessible by way of the input/output unit for providing a signal to verifiably identify the network appliance to other network nodes to provide evidence that at least one capability of the storage box can be trusted.

The memory storage location may be adapted to receive a removable bulk memory storage device such as a disc or tape cartridge.

Preferably the trusted device is tamper-resistant. The trusted device preferably has an engine capable of using cryptographic processes to enable it to prove identity, both locally and at a distance.

The use of a trusted device in a computing platform such as a PC which is used to communicate with other computing platforms on a network is disclosed in thecommonly owned U.S. Pat. No. 6,988,250 corresponding to WO00/48063 (Application No. PCT/GB00/00528) and reference should be made to that specification for a discussion of the desirable functions capable of being performed by a trusted device incorporated into such a computing platform.

The use of a TPM (trusted platform module) in relation to a TCP (trusted computing platform) has been specified by the TCPA (Trusted Computing Platform Alliance), formed initially by Compaq Computer Corporation, Hewlett-Packard Company, IBM Corporation, Intel Corporation, Microsoft Corporation, in the TCPA specification version 1.0.

When used in a PC, the trusted device desirably has the important function of reporting true values of integrity metrics of the components of the software of the computing apparatus, such as of the BIOS memory.

Although the trusted device employed in accordance with the first, second and third aspects of the invention may with advantage be arranged to report an integrity metric, it should be appreciated that this is not an essential requirement of the trusted device utilized in the present invention.

Advantageously, the function of the trusted device of the network appliance, to verifiably identify the network appliance in communicating with other nodes on this network, is important because the network may have a plurality of network appliances available for use by a client computer. The identity provides evidence that the capabilities in the trusted network appliance which must be trusted can be trusted, because of the way the identity is set up, including trust in the organizations that produced the network appliance.

The trusted appliance may have a plurality of identities, different identities being used, for example, for interactions with different parties.

However, even though the user may trust the organization that produced the storage box, there may be the possibility that the storage box has been illegally corrupted in some way by another user.

The trusted device preferably provides the root of trust for reporting on the trusted appliance. It is preferred that the trusted device is arranged to report integrity information, the integrity information being chosen so as to provide confidence that the trusted appliance will operate as expected.

In order to perform the identification and integrity reporting functions, the trusted device is preferably in the form of a TPM in accordance with the TCPA specification, and identity is proved by the authentication procedure specified in the TCPA specification.

Although the TPM provides the 'root of trust for reporting', the 'root of trust for measurement' is preferably another component in the trusted appliance, such as one of the other chips within a controller of the appliance, for example an ASIC (application specific integrated circuit) of the controller. That component is desirably the first component which obtains control after the appliance is switched on, and this will depend upon the architecture of the appliance.

The integrity information is generated in response to a challenge by the user. The user receives the response, extracts the integrity information from the response and compares the integrity metrics or hashes of these metrics with previously authenticated metrics for the appliance components that had been provided by a trusted party, which is a party that is prepared to vouch for the trustworthiness of the particular appliance component.

The integrity information typically comprises the values of a 160-bit register each containing a hash of different component integrity metrics.

In one advantageous embodiment of the invention the trusted device incorporates an encrypter arranged to encrypt data received by the input of a trusted storage box for writing to the storage location in an encrypted form. Hence only that trusted storage box, or a limited number of other trusted storage boxes having the same encryption keys, could recover the data in a meaningful way.

According to a fourth aspect of the invention a network comprises a network appliance which does not include a CPU but is connected to a first network node and a network device connected to a second network node. The network appliance includes a trusted device physically associated with the network appliance. The network is configured such that, in use, the network device interrogates the network appliance to cause the trusted device to provide a signal which is communicated to the network device. The signal verifiably identifies the network appliance to the network device to provide evidence that at least one capability of the network appliance can be trusted.

According to a fifth aspect of the invention a trusted storage box comprises one or more redundant arrays of independent disk (RAID) assemblies. Each RAID assembly includes a respective RAID controller and a respective group of disk drives controlled by the RAID controller. The storage box includes a common host which communicates with all the RAID controllers by fiber-channel links. The common host comprises a fiber-channel communication between a network input/output connection and the links. A respective trusted device is physically associated with each RAID controller. Each trusted device is connected for communication with at least one component of the respective RAID controller for providing a signal to the input/output connection indicative of a condition of the respective RAID controller.

According to a sixth aspect of the invention a network having a network appliance that does not include a CPU but does include a trusted device physically associated with said appliance that is connected to a first node of the network is operated by establishing communication between the first node and a network device connected to a second node of the network. The network device interrogates the trusted device to cause the trusted device to provide an integrity metric which is then used by the network device to verify the integrity of the network appliance.

BRIEF DESCRIPTION OF THE DRAWINGS

Various embodiments of the invention will now be described, by way of example only, with reference to the accompanying schematic drawings in which.

DETAILED DESCRIPTION OF THE DRAWINGS

Figure 1:
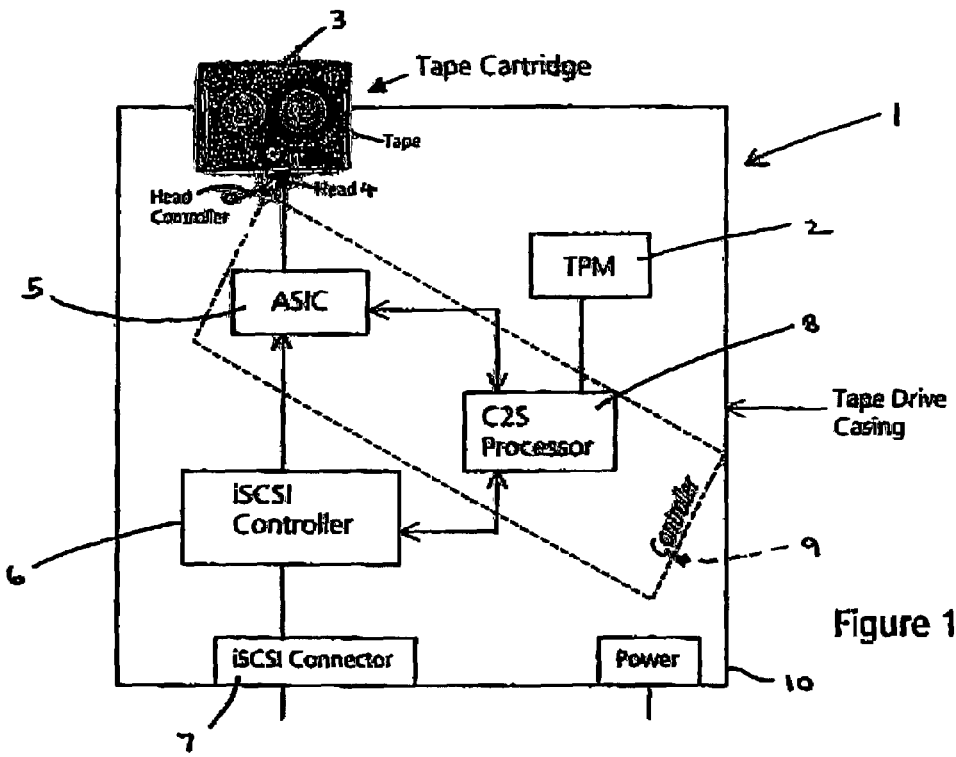
FIG. 1 is a block circuit diagram of a tape drive incorporating a trusted device in the form of a trusted platform module.

FIG. 1 includes a tape drive assembly which is largely conventional except for the important incorporation of a trusted device in the form of a trusted platform module (TPM) 2. The tape drive assembly 1 comprises a removable tape cartridge 3 and a read/write head 4 which communicates with an ASIC (application specific integrated circuit) 5. An iSCSI controller 6 provides an interface between the ASIC 5 chip and an iSCSI connector 7 for connection to a network link, such as an Ethernet bus. A C2S processor 8 runs the ASIC 5 in controlling the data flow to and from the head 4. The ASIC takes data and formats it.

The ASIC 5 and C2S processor 8 together constitute a tape drive controller 9.

Housed inside the tape drive casing 10 is the TPM 2 which is in the form of an independently encapsulated module resistant to tampering. In this example, the TPM 2 can be of the form described in the above-mentioned Patent Specification No. WO 00/48063, with particular reference to FIG. 3 thereof. The functions provided by such a TPM are indicated in FIG. 4 hereof.

The TPM 2 communicates directly with the C2S processor 8 and via processor 8 with ASIC 5. The software/firmware of C2S processor 8 and of ASIC 5 are modified, as compared with a conventional tape drive, in order to provide appropriate interactions with TPM 2.

One of the functions performed by the TPM on receipt of a new delivery instruction by the iSCSI connector 7 from the bus connected thereto is to prove an identity, and the method of providing and verifying identity is by way of the authentication procedure defined for a TPM in the TCPA.

Figure 5:
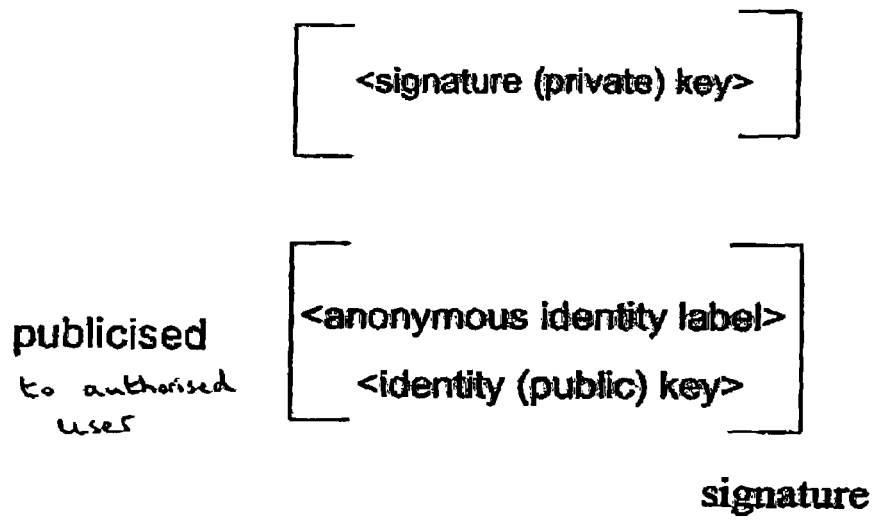
FIG. 5 is the format of a certificate that can be provided by a TPM to prove identify of the associated NAS box.

FIG. 5 shows the form of a TCPA identifier that is preferably employed by the TPM to provide the identity of the TPM. The identifier is in the form of a signed certificate.

Once the identity of the tape drive 1 has thus been confirmed to the client computer, the integrity of the controller 9 is required to be demonstrated. This is preferably demonstrated by the TPM computing a hash total of selected elements of software contained in a chip of the controller 9, which may be the ASIC chip itself and/or a chip of the C2S processor 8. The chosen chip/s thus provides the root of integrity measurement.

The hash total is provided to the client computer which compares the measured hash total, in manner described in Specification WO 00/48063 with an authenticated hash total.

Thus, the TPM 2 provides the root of trust for integrity reporting of the tape drive 1, and the root of trust for integrity measurement is one of the other chips within the tape drive.

Figure 2:
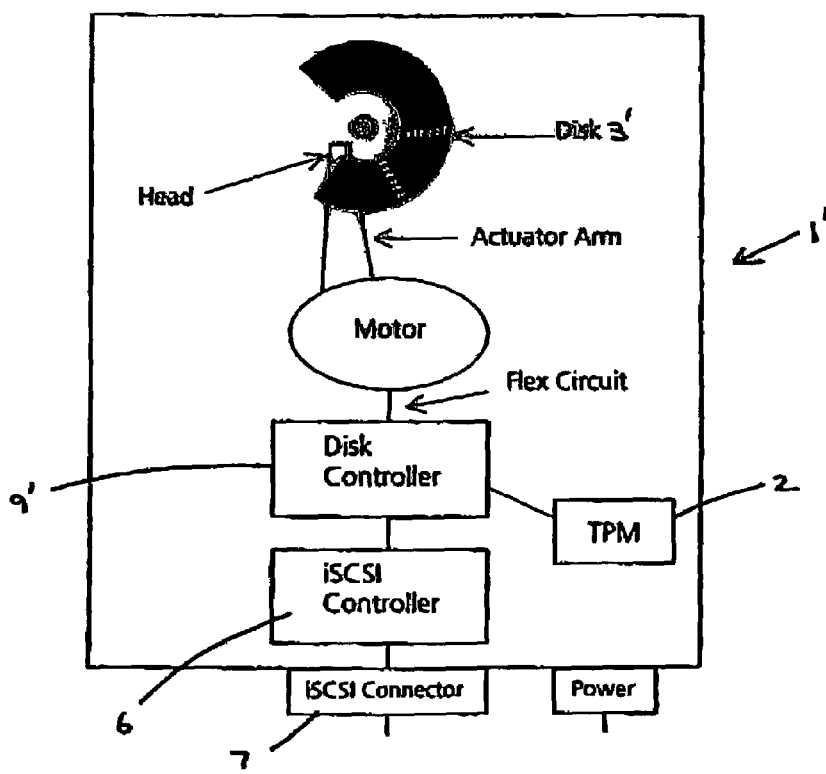
FIG. 2 is a block circuit diagram of a hard disk drive incorporating a trusted device in the formi of a trusted platform module.

With reference to FIG. 2, an otherwise conventional hard disk drive 1' may similarly be modified by incorporation of a TPM 2 inside casing 10. TPM 2 functions in association with the disk controller 9'. The hard disk drive 3' will usually incorporate multiple platters provided with spiral tracks in known manner.

Figure 3:
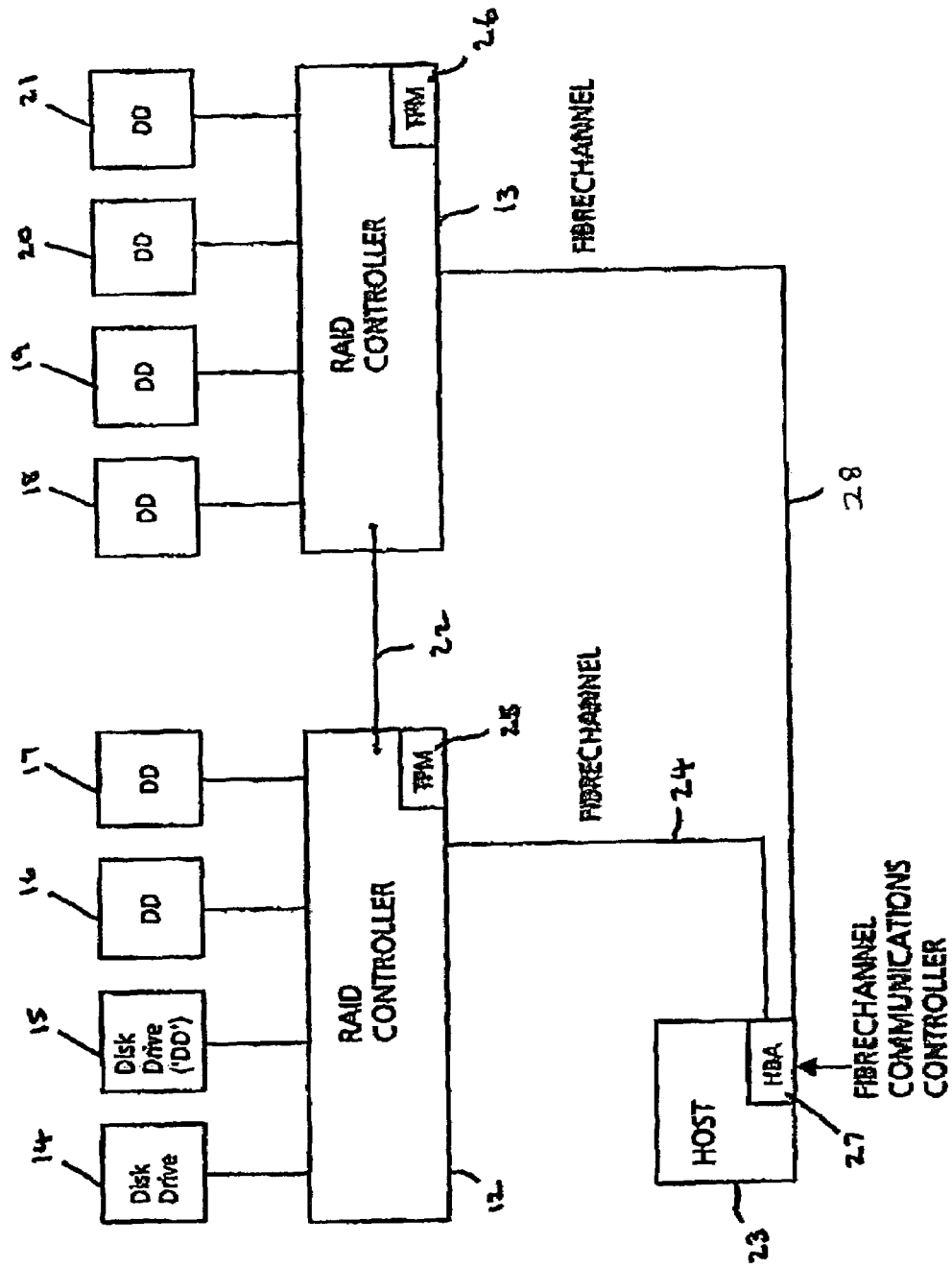
FIG. 3 is a block diagram of a bulk storage assembly incorporating two RAID units.
Figure 4:
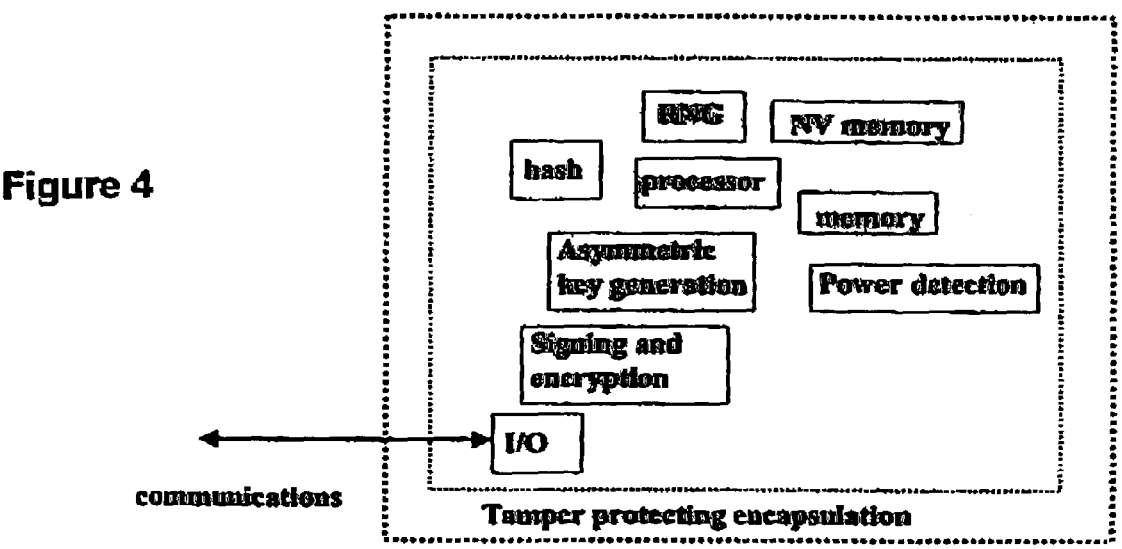
FIG. 4 is a block diagram of a trusted platform module, TPM.

In FIG. 3 is illustrated a bulk storage facility comprising an assembly of two RAID controllers 12, 13 with their disk drive units 14, 15, 16, 17, 18, 19, 20, 21. The number of RAID assemblies could equally be one or more than two. The RAID controllers 12, 13 shown in FIG. 3 are linked together by link 22 and are connected to a common host 23 by way of respective fiber-channel links 24, 28, the host 23 being provided with a fiber-channel communications controller 27 for connection to an external fiber-channel link. Fiber-channels are multiple-fiber optical links of high capacity and speed.

Each of the RAID controllers 12, 13 incorporates a TPM 25, 26 each configured to provide similar functionality to the TMP 2 of the embodiments of FIGS. 1 and 2.

It would be possible to use bulk storage in the form of silicon storage devices (SSD's) that use RAM memory chips. A TPM could be embedded in this architecture to provide similar functions to those described herein in relation to the tape and disk drives.

The invention claimed is:

1. A network appliance that does not include a CPU, said network appliance comprising a trusted device,
   the trusted device being connected for communication with at least one other component of the appliance and being accessible by way of a network connection to the network appliance,
   the trusted device being operable to provide, via said network connection, a first signal that contains a digitally verifiable identity of the network appliance so as to provide evidence that at least one capability of the appliance can be trusted, and
   the trusted device being further operable to provide, via said network connection, a second signal that contains digitally verifiable integrity information on an integrity metric of the network appliance, said integrity information being different from said identity and associated with the other component of the appliance.

2. A network appliance as claimed in claim 1, wherein the trusted device is an independently encapsulated module housed in a casing of said network appliance.

3. A network appliance as claimed in claim 1, wherein the trusted device comprises an engine operable to use cryptographic processes to provide at least said first signal in the form of a certified signature.

4. A network appliance as claimed in claim 1, wherein the trusted device is arranged to acquire a true value of the integrity metric of the network appliance and include at least said acquired value as the integrity information in the second signal.

5. A network appliance as claimed in claim 4, wherein the trusted device has a memory arrangement storing therein an authenticated value of the integrity metric of the network appliance, said authenticated value being generated by a trusted party and different from said identity,
   the trusted device being arranged to generate said second signal in response to a received challenge, the second signal comprising both the acquired value and the authenticated value of the integrity metric of the network appliance as said integrity information,
   both said values being signed by an encryption function of said trusted device using a private encryption key.

6. A network appliance as claimed in claim 4, in which said trusted device is configured to calculate the acquired value based on selected elements of software of the other component of the network appliance.

7. A network appliance as claimed in claim 1, in which the appliance is a bulk non-volatile memory network storage device.

8. A network, comprising:
   a network node, and
   a network appliance as claimed in claim 1, said network node being connected to the network connection of said network appliance.

9. A trusted storage box, comprising:
   a bulk non-volatile memory storage location,
   an input/output unit for connection to a network,
   a controller for controlling reading and writing of data from and to said storage location, and
   a trusted device physically associated and connected for communication with said controller of the storage box,
   said trusted device being accessible by way of the input/output unit,
   the trusted device being operable to provide, via said input/output unit, a first signal that contains a digitally verifiable identity of the storage box so as to provide evidence that at least one capability of the storage box can be trusted, and
   the trusted device being further operable to provide, via said input/output unit, a second signal that contains digitally verifiable integrity information on an integrity metric of the storage box, said integrity information being different from said identity and associated with said controller.

10. A trusted storage box as claimed in claim 9, in which the trusted device is an independently encapsulated module housed in a housing of said storage box.

11. A trusted storage box as claimed in claim 9, in which the trusted device comprises an engine operable to use cryptographic processes to provide at least said first signal in the form of a certified signature.

12. A trusted storage box as claimed in claim 9, in which the trusted device complies with at least version 1.0 of the specification of the Trusted Computing Platform Alliance (TCPA).

13. A trusted storage box as claimed in claim 9, in which the trusted device is arranged to acquire a true value of the integrity metric of the storage box and include at least said acquired value as the integrity information in the second signal.

14. A trusted storage box as claimed in claim 13, wherein the trusted device has a memory arrangement storing therein an authenticated value of the integrity metric of the storage box, said authenticated value being generated by a trusted party,
the trusted device including an encryption function,
the trusted device being arranged to generate said second signal in response to a received challenge, the second signal comprising both the acquired value and the authenticated value of the integrity metric of the storage box as said integrity information,
both said values being signed by the encryption function of said trusted device using a private encryption key.

15. A trusted storage box as claimed in claim 13, wherein said trusted device is configured to calculate the acquired value based on selected elements of software of a chip of said controller.

16. A trusted storage box as claimed in claim 15, wherein the chip of the controller is an ASIC.

17. A trusted storage box as claimed in claim 9, in which the memory storage location comprises a tape drive, the location being adapted to receive a removable tape cartridge.

18. A trusted storage box as claimed in claim 9, in which the memory storage location comprises a disk drive, the location being adapted to receive a removable disk.

19. A trusted storage box as claimed in claim 9, wherein the trusted device incorporates an encryption arrangement for encrypting data received by the input/output unit of the trusted storage box and for writing the data to the storage location in an encrypted form, whereby only that storage box, or a limited number of other storage boxes having the same encryption keys, can recover the data in an initial form of said data.

20. A network, comprising:
a network node, and
a trusted storage box as claimed in claim 9, wherein the network node is connected to the input/output unit of said trusted storage box.

21. A network, comprising:
a network appliance that does not include a CPU, the appliance being connected to a first network node, and
a network device connected to a second network node,
the network appliance comprising a trusted device, the trusted device being connected for communication with at least one other component of the appliance and being accessible by way of a network connection to the network appliance,
the network being configured such that, in use, the network device interrogates the network appliance to cause the trusted device to provide
(i) a first signal which is communicated to the network device, said first signal including a digitally verifiable identity of the network appliance so as to provide evidence to the network device that at least one capability of the network appliance can be trusted, and
(ii) a second signal which is communicated to the network device and contains digitally verifiable integrity information on an integrity metric of the network appliance, said integrity information being different from said identity, associated with the other component of the appliance.

22. A trusted storage box as claimed in claim 15, comprising:
one or more RAID assemblies, each said RAID assembly comprising a respective RAID controller and a respective group of disk drives controlled by the RAID controller,
a common host for communicating with all of the RAID controllers by fiber-channel links, the common host comprising a fiber-channel communications controller for controlling communication between the input/output unit and said links,
a respective trusted device incorporated into each said RAID controller for providing said first and second signals indicative of a condition of the respective RAID controller.

23. A method of operating a network including a network appliance that does not include a CPU, the appliance being connected to a first node of the network and including a trusted device, the trusted device being connected for communication with at least one other component of the appliance and being accessible by way of a network connection to the network appliance, the method comprising
establishing communication between said first node and a network device connected to a second node of the network,
causing said network device to interrogate the trusted device to cause the trusted device to provide digitally verifiable integrity information on an integrity metric of the network appliance,
causing the network device using the integrity information to verify the integrity of the network appliance;
wherein the integrity information provided by the trusted device comprises both (i) an authenticated value of the integrity metric of the network appliance, said authenticated value being generated by a trusted party and stored in a memory arrangement of said trusted device, and (ii) an acquired value of the integrity metric of the network appliance, said acquired value being calculated by said trusted device from selected elements of software of the other component of said appliance.

24. A method as claimed in claim 23, wherein said acquired value is a hash total of the selected elements of said software.

25. A trusted storage box as claimed in claim 9, wherein
said controller comprises a first processor configured to control reading and writing operations of a read/write head of said bulk non-volatile memory storage location;
said trusted device comprises a second processor different from the first processor, a non-volatile memory, and an input/output interface via which said second processor is communicated with said first processor of the controller; and
said trusted device further comprises an encapsulation housing therein said second processor, said non-volatile memory, and said input/output interface.

26. A network appliance as claimed in claim 1, wherein the other component is the first component which obtains control after the appliance is switched on.

27. A trusted storage box as claimed in claim 9, wherein the trusted device the root of trust for integrity reporting of the storage box, whereas the root of trust for integrity measurement is a chip of the controller within the storage box.

28. A method as claimed in claim 23, wherein the network device uses the integrity information to verify the integrity of the network appliance by
comparing the acquired value of the integrity metric with the authenticated value that had been provided by the trusted party.

* * * * *